(12) United States Patent
Billmyer

(10) Patent No.: US 7,048,310 B2
(45) Date of Patent: May 23, 2006

(54) SWICKLE CONNECTOR AND ASSEMBLY

(75) Inventor: Bryan A. Billmyer, Springfield, MO (US)

(73) Assignee: Central States Industrial Equipment & Services, Inc., Springfield, MO (US)

( * ) Notice: Subject to any disclaimer, the term of this patent is extended or adjusted under 35 U.S.C. 154(b) by 156 days.

(21) Appl. No.: 10/641,994

(22) Filed: Aug. 15, 2003

(65) Prior Publication Data

US 2005/0035596 A1    Feb. 17, 2005

(51) Int. Cl.
*F16L 43/00*    (2006.01)
(52) U.S. Cl. .................... 285/179; 285/420; 73/863.86
(58) Field of Classification Search ................ 285/179, 285/198, 420; 422/82.04, 103; 73/863.81, 73/863.86
See application file for complete search history.

(56) References Cited

U.S. PATENT DOCUMENTS

| | | | |
|---|---|---|---|
| 145,432 A * | 12/1873 | Lee | 285/179 X |
| 862,045 A | 7/1907 | Barnett | |
| 1,575,432 A * | 3/1926 | Lewis | 285/179 X |
| 2,751,927 A * | 6/1956 | Kinney | 285/179 X |
| 2,923,567 A | 2/1960 | Jones et al. | |
| 4,268,479 A | 5/1981 | Webster | |
| 4,458,543 A | 7/1984 | Mieth | |
| 5,823,222 A | 10/1998 | Minshull et al. | |
| 6,516,677 B1 | 2/2003 | Suter | |
| 2002/0053799 A1 * | 5/2002 | Brandt et al. | 285/179 X |

OTHER PUBLICATIONS

The Perlick Co., Inc., "Proof Tank Sleeve Assembly" drawing, Jun. 22, 1972.
The Perlick Corp., "Lever Handle Trycock" drawing, Aug. 5, 1993.
Jensen Fitting Manufacturing LTD., "Swickle Adapter with the Hook" drawing, Sep. 14, 1983.
PBM "Sampling Valve Ideal for Beverage Industry" Brochure, 3 pages, apparently Apr. 2002 publication date.
PBM "Sanitary Rising Stem Sampling Valve" Brochure, 8 pages, apparently Jan. 2003 publication date.

* cited by examiner

*Primary Examiner*—Greg Binda
(74) *Attorney, Agent, or Firm*—Alvin R. Wirthlin

(57) ABSTRACT

A swickle connector includes a connector body with an inlet end and an outlet end that is adapted for engagement with a sealing member of a sampling device or the like. The outlet end of the connector body includes a central axis. A clamping seat is associated with the connector body and includes an equilibrium point that is coincident with the central axis such that a clamping force acting on the clamping seat extends only in the direction of the central axis to thereby cause substantially uniform sealing engagement of the outlet end with the sealing member.

20 Claims, 5 Drawing Sheets

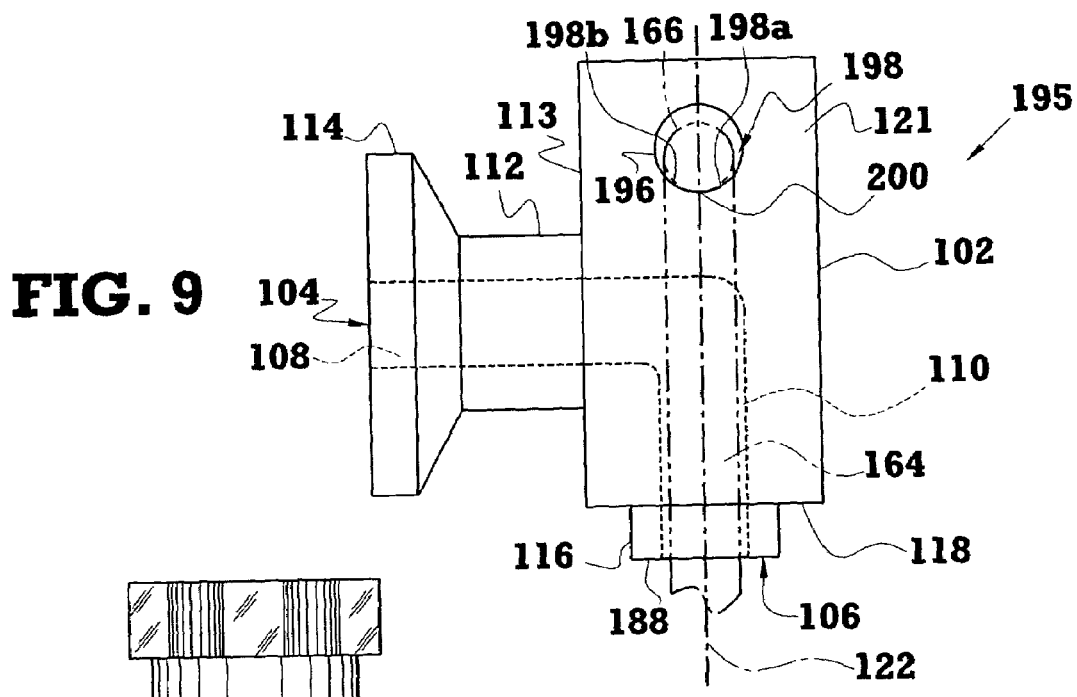
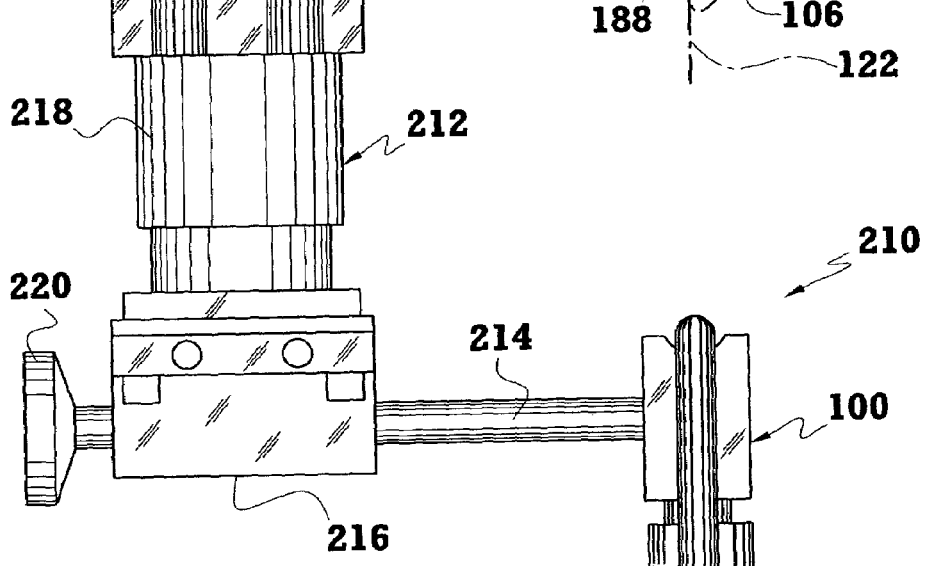

SWICKLE CONNECTOR AND ASSEMBLY

BACKGROUND OF THE INVENTION

This invention relates to sampling devices for in-line processing equipment, and more particularly to a swickle connector and assembly for drawing samples from, or otherwise diverting at least a portion of liquid from, a liquid flow line during transportation or processing of liquid substances and/or cleaning of the liquid flow line.

Liquid processing assemblies often employ one or more swickle connectors for diverting a portion of liquid from a pipeline during sampling or cleaning operations. A valve is often associated with the swickle connector for automatic or manual release of a fluid sample from a processing line through the swickle connector for analysis. By way of example, U.S. Pat. No. 4,268,479 issued to Webster on May 19, 1981 discloses a portable fluid analyzer with a sampling section that connects with a discharge port of a swickle connector through a retainer structure. The retainer structure includes a U-shaped bar that engages a tang on the swickle connector and a conduit that engages an outlet end of the swickle connector. A spring-biased lever arm is operably associated with the U-shaped bar so that the conduit is urged in sealing engagement with the outlet end of the swickle connector. With this type of swickle connector, it has been found that leakage can occur due to uneven compression forces acting around the perimeter of the swickle connector outlet end.

With reference to FIGS. 1 and 2 of the present application, the manner in which leakage may occur with a prior art swickle connector 10 is illustrated. The swickle connector 10 is typically associated with a sampling device 14 and a clamping device 12 for connecting the sampling device to the swickle connector. The swickle connector 10 includes a first hollow body portion 16 that extends generally horizontally and a second hollow body portion 18 that extends downwardly at approximately a 45 degree angle with respect to the first hollow body portion. A tang 20 extends upwardly from the first hollow body portion. The first hollow body portion 16 may include a mounting flange 21 that connects with a mounting flange 23 of a valve 25 (only partly shown) or the like. The clamping device 12 includes a clamping body 22, a U-shaped clamping bar 24 extending from the clamping body 22, and a threaded clamping rod 26 extending through a threaded bore (not shown) of the clamping body. A knurled head 28 is located at an outer free end of the threaded clamping rod 26. The sampling device 14 includes a main body portion 30 with an inlet end 32 and an outlet end 34. A bore 36 extends between the inlet and outlet ends. A pair of grooves 37 extend along a length of the main body portion 30 for accommodating spaced legs 39 of the clamping bar 24. The inlet end 32 includes a circular depression 38 and an annular seal 40 positioned within the depression. A tube 42 may be connected to the outlet end 34 for directing liquid to be tested into a container (not shown).

In use, the sampling device 14 is connected to the swickle connector 10 by installing the bridge of the U-shaped clamping bar 24 over the tang 20 and tightening the threaded clamping rod 26 against the main body portion 30. This tightening causes a first compression force to be exerted against the annular seal 40 by the peripheral edge 46 in a direction as represented by arrow 48. A second compression force is also exerted against the tang as represented by arrow 50. This second compression force causes relative rotational movement between the sampling device 14 and the swickle connector 10, as represented by arrow 52, resulting in uneven sealing pressure between the annular seal 40 and the peripheral edge 46 of the swickle connector 10. Consequently, fluid may leak between the annular seal and the swickle connector, as represented by arrows 54.

In addition to the above, when the sampling device is disconnected from the swickle connector, there is a possibility that a worker may be sprayed with hot caustic solution during a cleaning operation due to the angle at which the second hollow body portion 18 extends.

It would therefore be desirable to provide a device that substantially reduces or eliminates relative rotational movement between the swickle connector and the sampling device. It would further be desirable to provide a swickle connector that ejects cleaning fluid toward a safer location during a cleaning or sampling operation.

BRIEF SUMMARY OF THE INVENTION

In accordance with one aspect of the invention, a swickle connector comprises a connector body with an inlet end and an outlet end that is adapted for engagement with a sealing member. At least one conduit extends between the first conduit and the outlet end. The outlet end of the connector body includes a central axis. A clamping seat is associated with the connector body and includes an equilibrium point that is coincident with the central axis such that a clamping force acting on the clamping seat extends only in the direction of the central axis to thereby cause substantially uniform sealing engagement of the outlet end with the sealing member.

In accordance with a further aspect of the invention, a swickle assembly comprises a swickle connector, a clamping device, and a sampling device connected to the swickle connector by way of the clamping device.

The swickle connector has a connector body with an inlet end and an outlet end. At least one conduit extends through the connector body between the inlet end and the outlet end. The outlet end has a central axis. A clamping seat is associated with the connector body and has an equilibrium point that is coincident with the central axis.

The sampling device includes a main body portion with an inlet end connected to the outlet end of the swickle connector and an outlet end. At least one bore extends between the inlet and outlet ends of the main body portion.

The clamping device includes a first adjustment portion in contact with the sampling device and a second adjustment portion operably associated with the first contact portion and movable between a locked and an unlocked position. The second adjustment portion has a clamping bar with at least one leg portion that extends substantially parallel with the central axis and a bridge portion that extends transverse to the at least one leg portion. The clamping bar can be embodied in several different ways, including solid and/or flexible bar members. The bridge portion is seated in the clamping seat when the adjustable clamping mechanism is in the locked position to thereby firmly connect the swickle connector to the sampling device. In this manner, a clamping force acting on the clamping seat by the clamping device extends only in the direction of the central axis to thereby cause substantially uniform sealing engagement of the swickle connector outlet end with the sampling device inlet end.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein:

FIG. 9 is a side elevational view of a swickle connector in accordance with an even further embodiment of the invention; and FIG. 10 is a side elevational view of a swickle assembly in accordance with yet another embodiment of the invention.

It is noted that the drawings are intended to depict only typical embodiments of the invention and therefore should not be considered as limiting the scope thereof. The invention will now be described in greater detail with reference to the accompanying drawings.

DETAILED DESCRIPTION OF THE INVENTION

Figure 3:
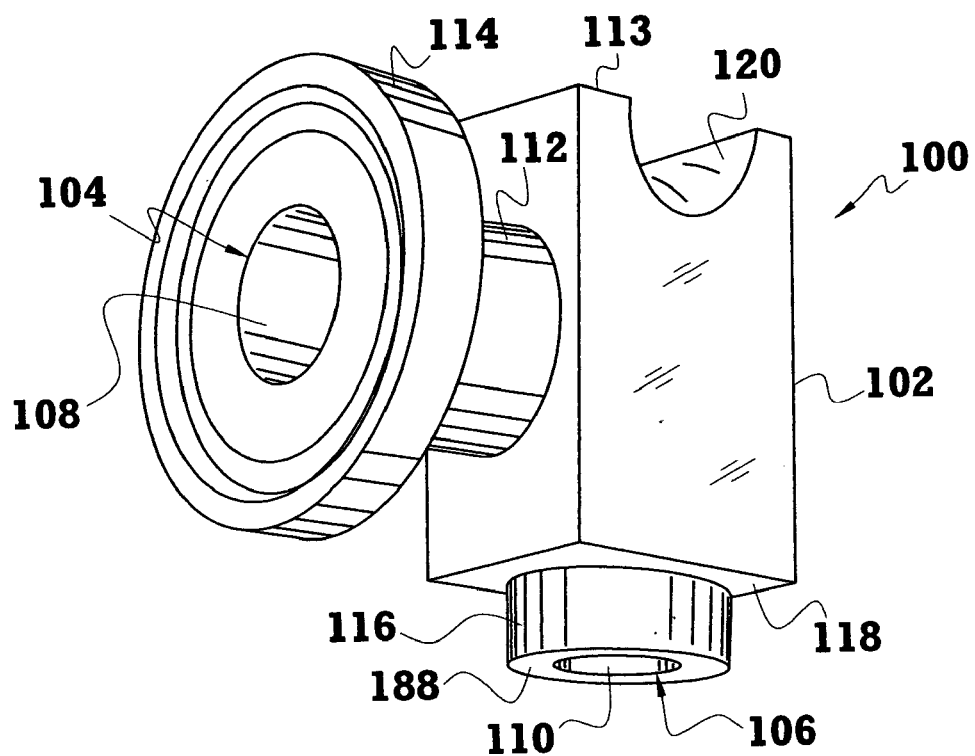
FIG. 3 is a rear perspective view of a swickle connector in accordance with an exemplary embodiment of the present invention.
Figure 4:
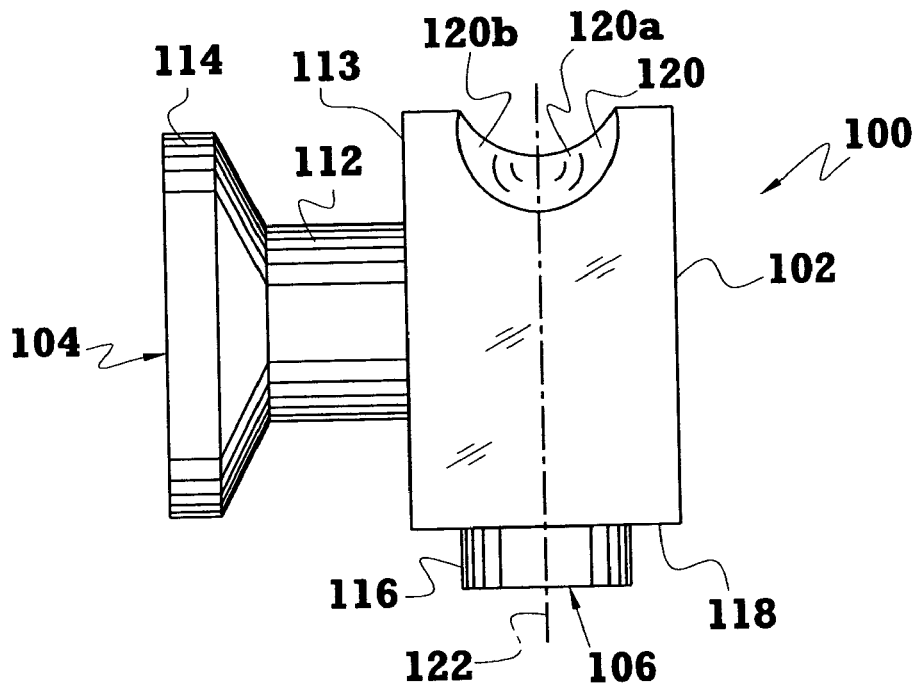
FIG. 4 is a side elevational view of the swickle connector of FIG. 3.
Figure 5:
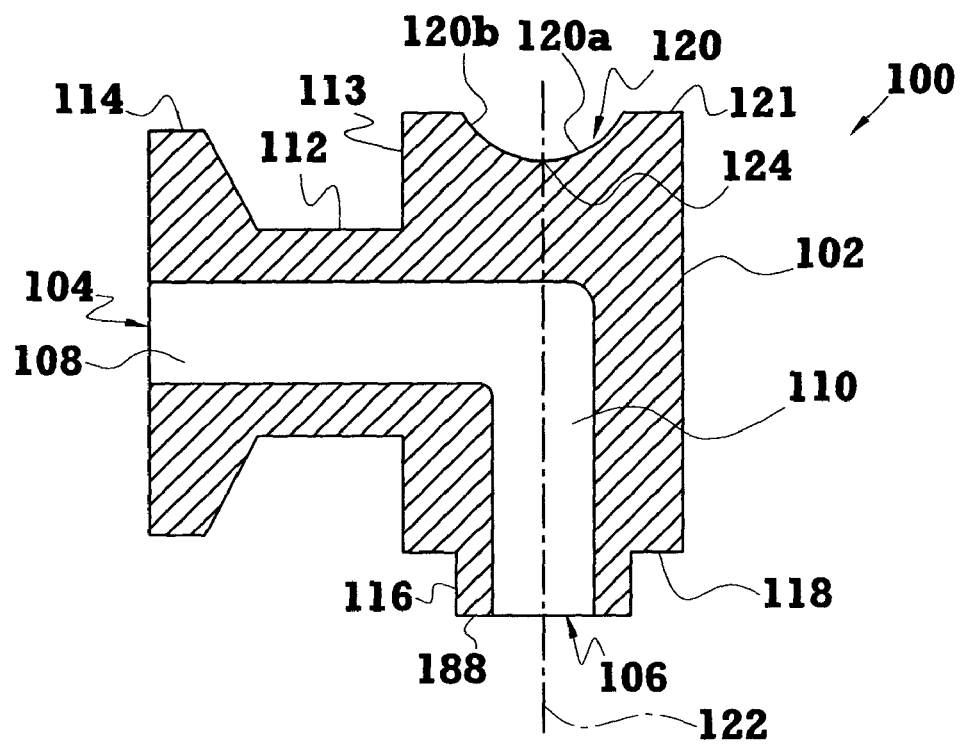
FIG. 5 is a sectional elevational view of the swickle connector of FIG. 3.

Referring now to the drawings, and to FIGS. 3–5 in particular, a swickle connector 100 in accordance with the present invention is illustrated. The swickle connector 100 includes a swickle body 102 with an inlet end 104 and an outlet end 106. A first conduit or bore 108 extends into the swickle body 102 from the inlet end 104. A second conduit or bore 110 extends into the swickle body 102 from the outlet end 106 and intersects the first bore 108. Preferably, but not necessarily, the first and second bores are perpendicular. The swickle connector 100 may be constructed of various materials, such as stainless steel or other metals, plastic, composites, and so on.

Figure 1:
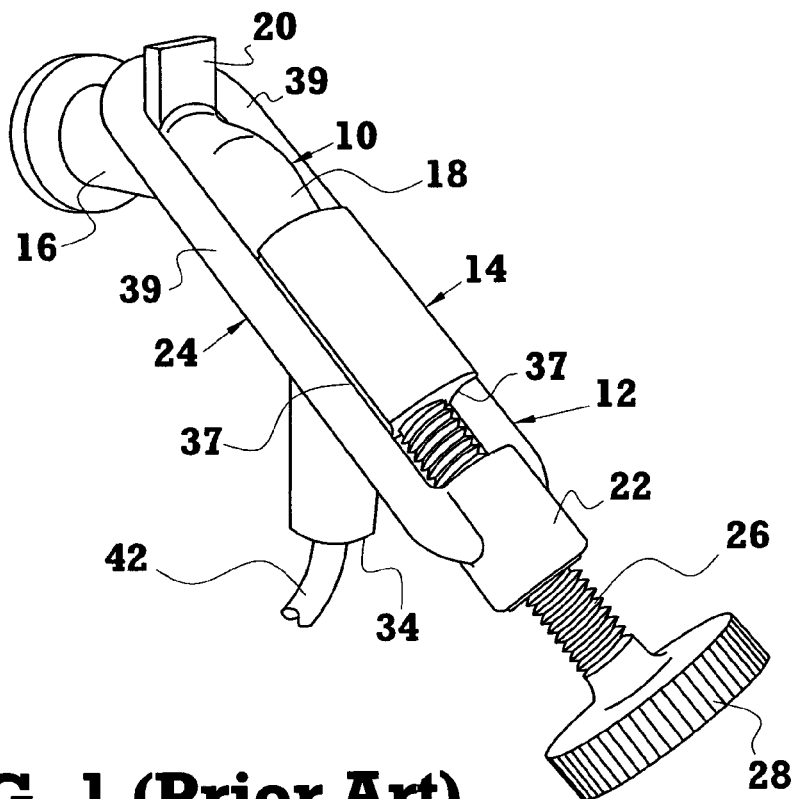
FIG. 1 is a front perspective view of a prior art swickle connector and associated clamp.
Figure 2:
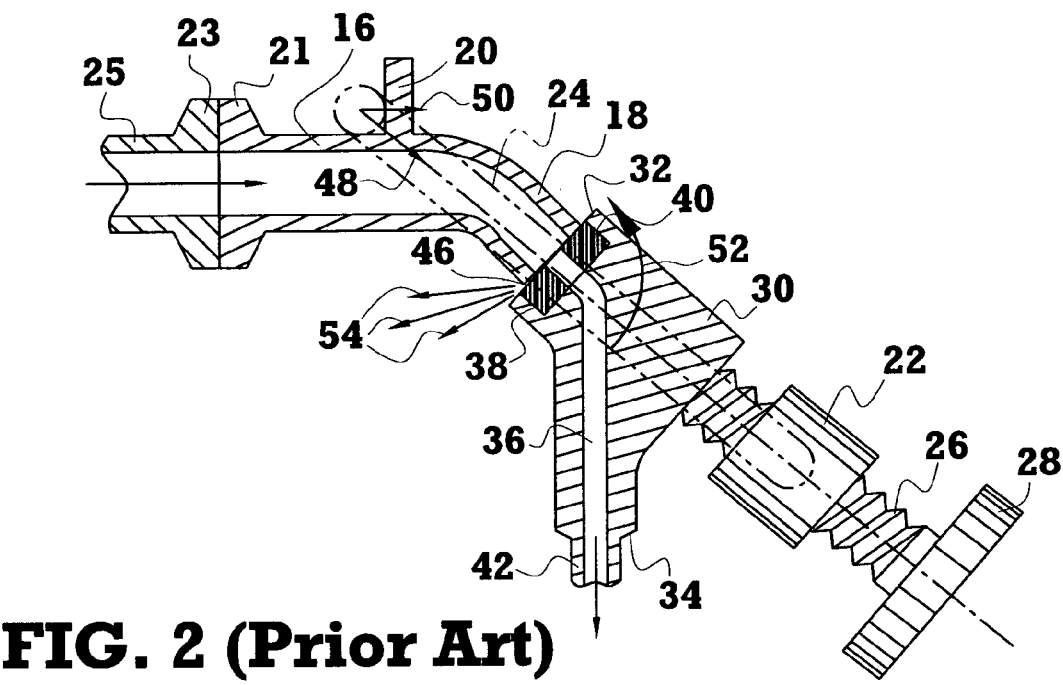
FIG. 2 is a sectional view of the swickle connector and clamp of FIG. 1.

The inlet end 104 may include a boss 112 that extends laterally from a side surface 113 of the swickle body 102 and a mounting flange 114 that is connected to an outer free end of the boss 112. The mounting flange 114 is adapted for connection with a mounting flange 23 of a valve 25, pipe, or the like (FIG. 1). It will be understood that the boss 112 and/or mounting flange 114 can be eliminated and the inlet end 104 can be directly connected to a valve, pipe or the like through welding, clamps, compression fittings, or other well-known connection means. It will be further understood that the outlet end and inlet end can be reversed.

The outlet end 106 may also include a boss 116 that extends downwardly from a lower surface 118 of the swickle body 102. A mounting flange (not shown) may be connected to a lower end of the boss 116. Alternatively, the boss and/or swickle body 102 may be connected, through well-known connection means as described above, to an inlet port of a sampling device, an outlet tube, or other well-known structure for directing the flow of fluid from one location to another.

A clamping seat 120 is formed in an upper surface 121 of the swickle body 102. As shown, the clamping seat 120 is arcuate in shape with a first surface portion 120a and a second surface portion 120b. A lower-most portion or equilibrium point 124 is at the intersection of the first and second surface portions and is in alignment with a central axis 122 of the outlet end 106 and second bore 110. Preferably, the first surface portion 120a to the right of the equilibrium point 124 is symmetrical with the second surface portion 120b to the left of the equilibrium point, as viewed in FIG. 5.

Figure 6:
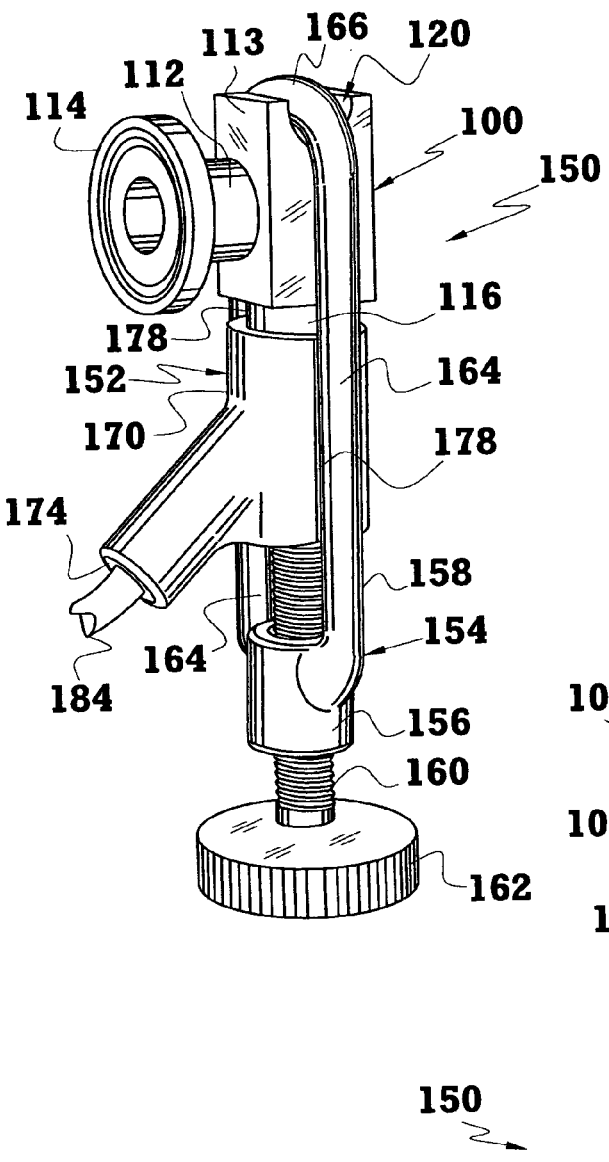
FIG. 6 is a rear perspective view of a swickle assembly including the swickle connector of FIG. 3 and an associated clamping device.
Figure 7:
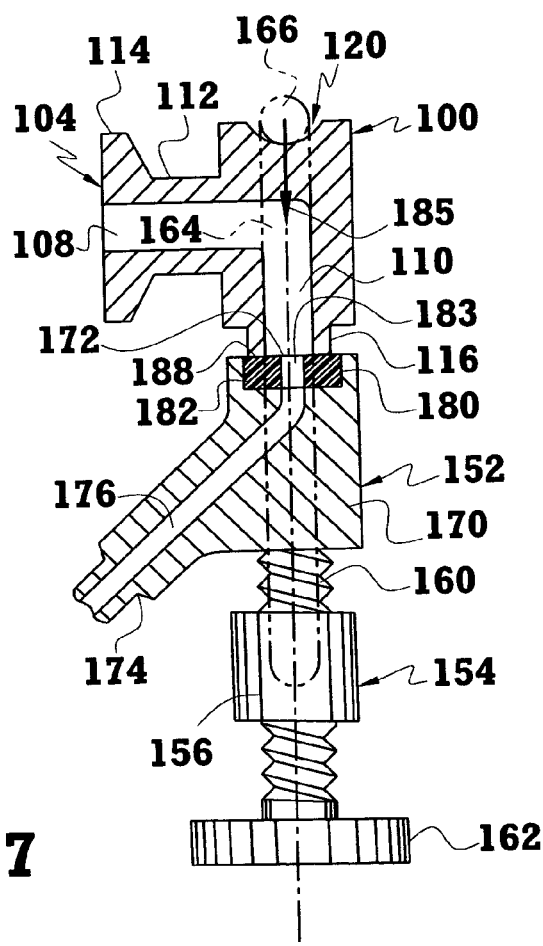
FIG. 7 is a sectional view of the swickle assembly of FIG. 6.

With additional reference to FIGS. 6 and 7, a swickle assembly 150 in accordance with the present invention includes a swickle connector 100, a sampling device 152, and a clamping device 154 that connects the swickle connector 100 to the sampling device 152.

The clamping device 154 includes a clamping body 156, a first adjustment portion in the form of a U-shaped clamping bar 158 extending from the clamping body 156, and a second adjustment portion in the form of a threaded clamping rod 160 extending through a threaded bore (not shown) of the clamping body. A knurled head 162 is located at an outer end of the threaded clamping rod 160. The U-shaped clamping bar 158 has a pair of leg portions 164 that extend downwardly from an arcuate bridge portion 166 that extends generally transverse to the leg portions.

The sampling device 152 includes a main body portion 170 with an inlet end 172 and an outlet end 174. A bore 176 extends between the inlet and outlet ends. A pair of elongate grooves 178 extend along a length of the main body portion 170 for accommodating the leg portions 164 of the clamping bar 158. The inlet end 172 includes a circular depression 180 and an annular seal 182 positioned within the depression. A tube 184 may be connected to the outlet end 174 in a well-known manner for directing liquid to be tested into a container (not shown) or other receptacle. For the sampling of certain kinds of liquids, the tube 184 may be spiral-shaped as is well known in the art for slowing the flow of liquid.

In use, the sampling device 152 is connected to the swickle connector 100 by positioning the leg portions 164 of the U-shaped clamping bar 158 on either side of the swickle connector and aligning the bridge portion 166 with the arcuate clamping seat 120 such that the bore 110 of the swickle connector 100 is in fluid communication with the bore 176 of the sampling device 152. The threaded clamping rod 160 is then tightened against the main body portion 170 until the clamping bar 158 moves from an unclamped poosition to a damned position wherein the bridge portion 166 is firmly seated at the equilibrium point 124 of the clamping seat 120. The symmetrical nature of the clamping seat 120 on opposite sides of the central axis 122 facilitates alignment of the outlet end 106 with the opening 183 in the annular seal 182. Since the equilibrium point 124 of the arcuate clamping seat 120 is in alignment with the central axis 122, and further since the leg portions 164 of the U-shaped clamping bar 158 are parallel with the central axis 122, the outer peripheral surface 188 of the boss 116 exerts an equal pressure on the annular seal 182 only in the direction of the central axis 122, as represented by arrow 185 in FIG. 7, to thereby create a uniform sealing engagement between the annular seal and the outer peripheral surface 188 of the boss 116. In this manner, leakage due to uneven sealing pressure as in the prior art is eliminated.

In addition to the above, when the sampling device 154 is disconnected from the swickle connector 100, the downward facing position of the outlet end 106 reduces the possibility of spraying a worker with sample fluid during a sampling operation and/or hot caustic solution during a cleaning operation.

Figure 8:
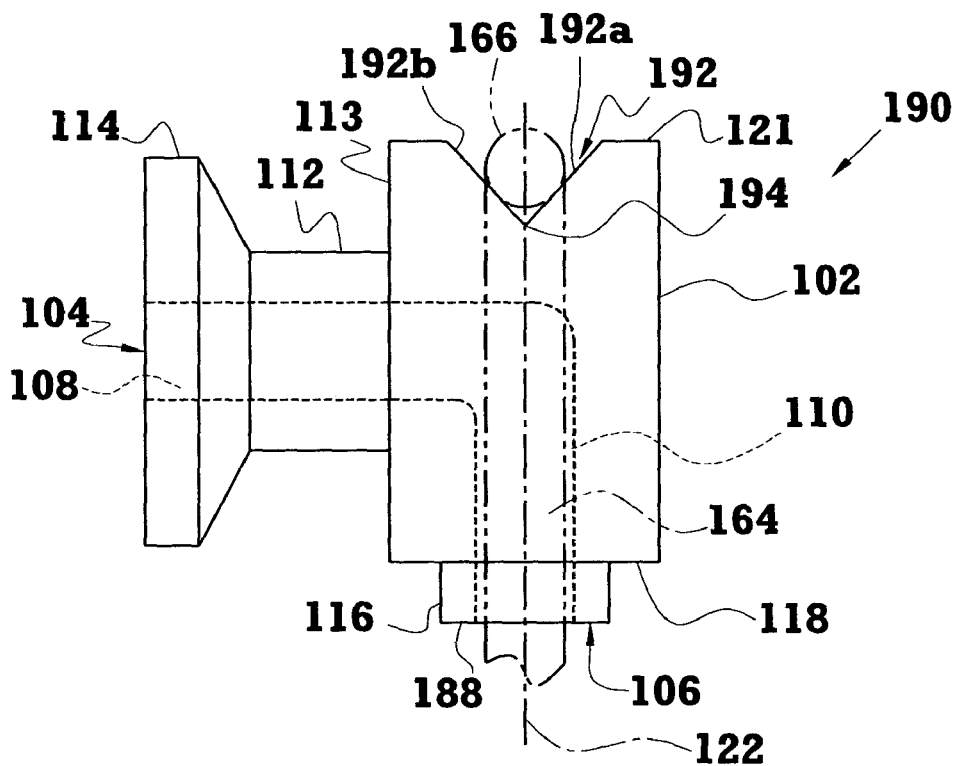
FIG. 8 is a side elevational view of a swickle connector in accordance with a further embodiment of the invention.

With reference now to FIG. 8, a swickle connector 190 in accordance with a further embodiment of the invention is illustrated. The swickle connector 190 is similar to the swickle connector 100 with the exception that the arcuate clamping seat 120 is replaced with a triangular clamping seat 192. As shown, the clamping seat 192 has a first surface portion 192a and a second surface portion 192b that intersect at a lower-most portion or equilibrium point 194 that is in alignment with the central axis 122 of the second bore 110 so that the outer peripheral surface 188 of the boss 116 will exert an equal pressure on the annular seal 182 (FIG. 7) when the bridge portion 166 (shown in phantom line) is firmly seated on the triangular clamping seat 192.

With reference now to FIG. 9, a swickle connector 195 in accordance with a further embodiment of the invention is illustrated. The swickle connector 195 is similar to the swickle connector 100 with the exception that the arcuate clamping seat 120 is replaced with an aperture 196 that extends through the swickle body 102. The aperture 196 has a circular clamping seat 198 with a first surface portion 198a and a second surface portion 198b that intersect at a lower-most portion or equilibrium point 200. As in the previous embodiments, the equilibrium point 200 is in alignment with the central axis 122 of the second bore 110 so that the outer peripheral surface 188 of the boss 116 will exert an equal pressure on the annular seal 182 (FIG. 7) when the swickle connector 195 is connected to the sampling device. Although the U-shaped clamping bar may be used with this embodiment, the bridge portion 166 may be split to permit its insertion into the aperture 196 from opposite sides of the swickle connector 195.

With reference now to FIG. 10, a swickle assembly 210 in accordance with yet another embodiment of the invention is illustrated. The swickle assembly 210 includes a swickle connector 100, as previously described, connected between a conventional valve assembly 212 and a sampling device 152. The swickle connector 100 is connected to the sampling device 152 by way of the clamping device 154 as previously described. The swickle connector 100 is also connected to the valve assembly 212 by way of a tubular extension 214. Preferably, the tubular extension 214 is directly welded to the swickle connector and the valve assembly. However, it will be understood that conventional connection means can be used, such as mounting flanges, clamps, compression fittings, and so on. The valve assembly 212 is preferably of conventional construction and includes a valve body 216 that houses an internal valve (not shown) and an adjustment knob 218 for opening and closing the internal valve in a well-known manner. The adjustment knob 218 may be operated by hand and/or electrically and/or pneumatically to alternatively direct or stop fluid flow through the valve body 216. A mounting flange 218 or other connection means may be provided on the valve body 216 for connecting the valve assembly 212 to a fluid ejection port or the like of a liquid flow line (not shown). In this manner, the swickle assembly can control the release of a fluid sample or cleaning solution from a liquid flow line and direct the released fluid through the swickle connector 100 and the sampling device 152 or the like.

It will be understood that terms of orientation and/or position as may be used throughout the specification, such as laterally, downwardly, lower, and upper, as well as their respective derivatives and equivalent terms denote relative, rather than absolute orientations and/or positions.

It will be appreciated by those skilled in the art that changes could be made to the embodiments described above without departing from the broad inventive concept thereof. By way of example, the clamping seat may be of different shapes, such as a flat C-shaped channel and so on, and may be formed separately and connected to the main body, as long as an equilibrium point of the clamping seat is in alignment with the central axis of the seal contact surface of the outlet end so that equal compression forces are present around the periphery of the outlet end when connected to a sampling device, receptacle, tube, or the like.

In addition, the clamping bar may take other forms, such as a single leg portion with a hook-shaped end for engaging the clamping seat or double leg portions with hook-shaped ends for engaging opposite ends of the clamping seat. Instead of a rigid material, the clamping bar may alternatively be embodied as a flexible cable or cord and tightened around the clamping seat using well-known techniques.

In yet a further embodiment, the clamping device may be embodied as an over-center lock mechanism so that adjustment of a lever arm causes the clamping bar to be drawn and locked into the clamping seat of the swickle connector.

Moreover, the mounting flange may take other forms or be eliminated and directly welded to a valve body, or a separate clamping mechanism may be provided.

It will be further understood that the swickle connector may have more than one inlet and/or outlet, may be provided with different shapes, and so on.

It will be understood, therefore, that this invention is not limited to the particular embodiments disclosed, but it is intended to cover modifications within the spirit and scope of the present invention as defined by the appended claims.

I claim:

1. A swickle connector comprising:
    a connector body having a surface, an inlet end and an outlet end adapted for engagement with a sealing member, the outlet end having a central axis, the surface being spaced from the outlet end and extending through the central axis;
    at least one conduit extending through the connector body between the inlet end and the outlet end;
    the surface forming a clamping seat with first and second surface portions that intersect at an equilibrium point coincident with the central axis such that a clamping force acting on the clamping seat extends only in the direction of the central axis to thereby cause substantially uniform axial sealing engagement of the outlet end with the sealing member.

2. A swickle connector according to claim 1, wherein the first surface portion and the second surface portion are shaped to form an arcuate clamping seat.

3. A swickle connector according to claim 1, wherein the first and second surface portions are symmetrical about the central axis.

4. A swickle connector according to claim 3, wherein the at least one conduit comprises a first conduit extending into the connector body from the inlet end and a second conduit extending between the first conduit and the outlet end.

5. A swickle connector according to claim 4, wherein the first and second conduits are perpendicular to each other.

6. A swickle connector according to claim 3, wherein the first and second surface portions extend at an angle with respect to the first conduit to form a triangular clamping seat.

7. A swickle connector according to claim 6, wherein the second conduit is coincident with the central axis.

8. A swickle connector according to claim 5, wherein the first and second conduits are perpendicular to each other.

9. A swickle connector according to claim 1, wherein the clamping seat is formed in the connector body.

10. A swickle connector according to claim 1, wherein the first and second surface portions extend at an angle with respect to the at least one conduit to form a triangular clamping seat.

11. A swickle connector according to claim 1, wherein at least a portion of the at least one conduit is coincident with the central axis.

12. A swickle connector according to claim 1, wherein the surface is formed on the connector body opposite the outlet end.

13. A swickle assembly comprising:
   a swickle connector having:
      a connector body with an inlet end, an outlet end having a central axis, and a surface spaced from the outlet end, the surface extending through the central axis;
      at least one conduit extending between the inlet end and the outlet end; and
      a clamping seat formed on the surface and having an equilibrium point coincident with the central axis;
   a sampling device having:
      a main body portion with an inlet end connected to the outlet end of the swickle connector and an outlet end; and
      at least one bore extending between the inlet and outlet ends of the main body portion, the at least one bore being in fluid communication with the at least one conduit; and
   a clamping device having:
      a first adjustment portion;
      a second adjustment portion operably associated with the first adjustment portion, the second adjustment portion being in contact with the sampling device, the first adjustment portion being movable between a clamped and an unclamped position by the second adjustment portion and including a clamping bar with at least one leg portion that extends substantially parallel with the central axis outside of the main body portion, and a bridge portion that extends transverse to the at least one leg portion, the bridge portion being seated in the clamping seat and exerting pressure on the equilibrium point of the clamping seat along the central axis when the first adjustment portion is in the clamped position to thereby firmly connect the swickle connector to the sampling device;
   wherein a clamping force acting on the clamping seat by the clamping device extends only in the direction of the central axis to thereby cause substantially uniform sealing engagement of the swickle connector outlet end with the sampling device inlet end.

14. A swickle assembly according to claim 13, wherein the clamping seat comprises a first surface portion and a second surface portion, with the first and second surface portions intersecting at the equilibrium point.

15. A swickle assembly according to claim 14, wherein the first and second surface portions are symmetrical about the central axis.

16. A swickle assembly according to claim 13, wherein the first adjustment portion comprises a pair of leg portions that extend outside of the main body portion and parallel to the central axis from opposite sides of the bridge portion.

17. A swickle assembly according to claim 16, wherein the pair of leg portions and the bridge portion are constructed of a rigid material.

18. A swickle assembly according to claim 13, wherein the at least one conduit comprises a first conduit extending into the connector body from the inlet end and a second conduit extending between the first conduit and the outlet end, the first and second conduits being perpendicular to each other.

19. A swickle assembly according to claim 13, wherein the clamping seat is formed in the connector body.

20. A swickle assembly according to claim 13, and further comprising a valve assembly fluidly connected to the inlet end of the swickle connector.

* * * * *